(12) United States Patent
DeMont

(10) Patent No.: US 6,351,640 B1
(45) Date of Patent: *Feb. 26, 2002

(54) INITIATING A TELECOMMUNICATIONS CALL TO A PARTY BASED ON AN IDENTIFYING SIGNAL WIRELESSLY TRANSMITTED BY THE PARTY OR ITS PROXY

(75) Inventor: Jason Paul DeMont, Basking Ridge, NJ (US)

(73) Assignee: Lucent Technologies, Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/944,387

(22) Filed: Oct. 6, 1997

Related U.S. Application Data (62) Division of application No. 08/574,059, filed on Dec. 15, 1995.

(51) Int. Cl.[7] .............................. H04B 1/38; H04Q 7/32
(52) U.S. Cl. ...................... 455/426; 455/415; 455/460; 455/536; 455/564; 455/566; 455/575; 455/90; 455/351
(58) Field of Search ................................. 455/403, 414, 455/5, 426, 460, 466, 500, 517, 550, 556, 564, 566, 568, 569, 575, 91, 95, 99, 100, 227, 228, 343, 347, 348, 349, 351, 90, 127, 435; 343/702

(56) References Cited

U.S. PATENT DOCUMENTS

| | | | |
|---|---|---|---|
| 4,164,025 A | | 8/1979 | Dubnowski et al. ........ 364/900 |
| 4,922,518 A | | 5/1990 | Gordon et al. ................ 379/57 |
| 4,939,768 A | | 7/1990 | Inaba et al. .................... 379/58 |
| 4,980,910 A | | 12/1990 | Oba et al. ..................... 379/355 |
| 5,020,150 A | * | 5/1991 | Shannon ....................... 455/343 |
| 5,097,502 A | | 3/1992 | Suzuki et al. ................ 379/356 |
| 5,117,449 A | * | 5/1992 | Metroka et al. ............. 455/552 |
| 5,214,793 A | * | 5/1993 | Conway et al. .......... 455/517 X |
| 5,218,629 A | | 6/1993 | Dumond et al. ............... 379/59 |
| 5,230,073 A | | 7/1993 | Gausmann et al. .......... 395/600 |
| 5,276,729 A | | 1/1994 | Higuchi et al. ................ 379/58 |
| 5,280,516 A | | 1/1994 | Jang .............................. 379/57 |
| 5,307,349 A | | 4/1994 | Shloss et al. ............... 370/85.2 |
| 5,329,578 A | | 7/1994 | Brennan et al. ............... 379/67 |
| 5,365,516 A | | 11/1994 | Jandrell ........................ 370/18 |
| 5,412,654 A | | 5/1995 | Perkins et al. ............. 370/94.1 |
| 5,418,845 A | | 5/1995 | Reeder ........................ 379/213 |
| 5,428,678 A | | 6/1995 | Fitzpatrick et al. .......... 379/201 |
| 5,566,358 A | * | 10/1996 | Obayashi et al. ........ 455/435 X |
| 5,668,559 A | * | 9/1997 | Baro ........................... 343/702 |
| 5,835,861 A | * | 11/1998 | Whiteside ................... 455/466 |

* cited by examiner

Primary Examiner—William Trost
Assistant Examiner—Philip J. Sobutka
(74) Attorney, Agent, or Firm—DeMont & Breyer, LLC (57) ABSTRACT

A method and apparatus for initiating a telecommunications call. A plurality of beacons (102) are geographically disposed in a telecommunications system (100). Each beacon (102n) radiates an electromagnetic carrier that is modulated with an identifying address (e.g., a telephone number, an Internet address) for an associated terminal. An identifying signal is stored in a memory (206). A controller (208) modulates a carrier with the identifying signal and a transmission element (210) transmits the carrier to allow a communications terminal (104) to initiate a call to the associated communications terminal (114, 116). A wireless terminal (104a) includes a directional receiver (204). To initiate a call, a user points directional receiver (204) at a beacon. The directional receiver (204) receives the electromagnetic carrier and the wireless terminal recovers the identifying address. Wireless terminal (104) then uses the identifying address to initiates a call, in well-known fashion, to the communications terminal associated with the identifying address.

33 Claims, 8 Drawing Sheets

INITIATING A TELECOMMUNICATIONS CALL TO A PARTY BASED ON AN IDENTIFYING SIGNAL WIRELESSLY TRANSMITTED BY THE PARTY OR ITS PROXY

REFERENCE TO RELATED APPLICATION

This is a division of application Ser. No. 08/574,059, filed Dec. 15, 1995, now pending.

FIELD OF THE INVENTION

The present invention relates to telecommunications in general and, more particularly, to a method and apparatus for transmitting a signal.

DESCRIPTION OF THE RELATED ART

Telecommunications influences the personal, social and business affairs of people everyday. Over the past few decades, the telecommunications industry has made significant strides toward the goal of making their services available to anyone, anywhere and at anytime. These services have expanded through advances in wireless, broadband and multimedia telecommunications. In each of these areas, the most persistent obstacles to continued expansion arise from human factors. For example, one such obstacle is how to devise telecommunications equipment that will connect a caller to any party he or she wishes to be connected to at the moment he or she wishes to be connected.

Although people often conceive, and colloquially speak of, calling another person, a telephone system conventionally routes a call to a telephone and not, strictly speaking, to the desired person. But because the telephone system can only connect a call to a telephone and not to a person, a functional gap exists between what callers generally desire to do and what the telephone system enables them to do.

SUMMARY OF THE INVENTION

Embodiments of the present invention provide a method and apparatus for conveying an identifying signal (e.g., a telephone number, an Internet address) to a user to initiate a call (whether voice, video, data or multimedia) while avoiding many of the costs and restrictions associated with conventional techniques. Specifically, embodiments of the present invention transmit an electromagnetic carrier modulated with the identifying signal of an associated communication terminal (e.g., a wireless terminal, a wireline terminal, an automatic call distribution system) for receipt by a second communication terminal. The second communication terminal can, for example, use the identifying signal to initiate a call to the communication terminal associated with the embodiment.

An illustrative embodiment of the present invention comprises a beacon that transmits a signal that identifies one or more communication terminals. A beacon typically comprises a controller that drives a transmission element to radiate an electromagnetic carrier having modulated thereon an identifying signal of its associated communications terminal. In some embodiments, the beacon advantageously includes a receiver for use in remotely modifying the identifying signal for the beacon. Further, in other embodiments, a power source, such as a solar cell, advantageously provides power to beacons that operate in remote locations.

One or more communication terminals that include a directional receiver are used for receiving the signal from the beacons. The directional receiver is capable of receiving the electromagnetic carrier. A processor in the communication terminal is capable of recovering the identifying signal from the electromagnetic carrier, and initiating a call in well known fashion based on the identifying signal.

For example, an automobile containing a cellular telephone could have mounted by each license plate an embodiment of the present invention that radiates the telephone number of the cellular telephone in the automobile. If a user of a cellular telephone with a directional receiver desires to call that automobile, the user can point the directional receiver at one of the beacons to receive the identifying signal and initiate a call to the cellular telephone in the automobile.

Alternative embodiments of the invention provide a method and apparatus for initiating a telecommunications call (whether voice, video, data or multimedia) while avoiding many of the costs and restrictions associated with conventional techniques. Specifically, alternative embodiments of the present invention enable the initiation of a telecommunications call to a communication terminal (e.g., a wireless terminal, a wireline terminal, an automatic call distribution system, etc.) based on the reception of an identifying address (e.g., the telephone number, the Internet address) of the communications terminal via a directional receiver.

Illustratively, an alternative embodiment of the present invention comprises a wireless terminal that is operably connected to a directional receiver and operates in conjunction with one or more beacons. The directional receiver is capable of receiving the electromagnetic carrier. A processor in the alternative embodiment is capable of recovering the identifying signal from the electromagnetic carrier and initiating a call, in well-known fashion, based on the identifying signal.

For example, an automobile containing a cellular telephone can have mounted by each license plate a beacon that radiates the telephone number of the cellular telephone in the automobile. If a user of this alternative embodiment desires to call that automobile, the user can point the directional receiver at one of the beacons to receive the identifying signal and initiate a call to the cellular telephone in the automobile.

BRIEF DESCRIPTION OF THE DRAWING

Illustrative embodiments of the present invention are described with respect to the following drawings, wherein.

DETAILED DESCRIPTION

Figure 1:
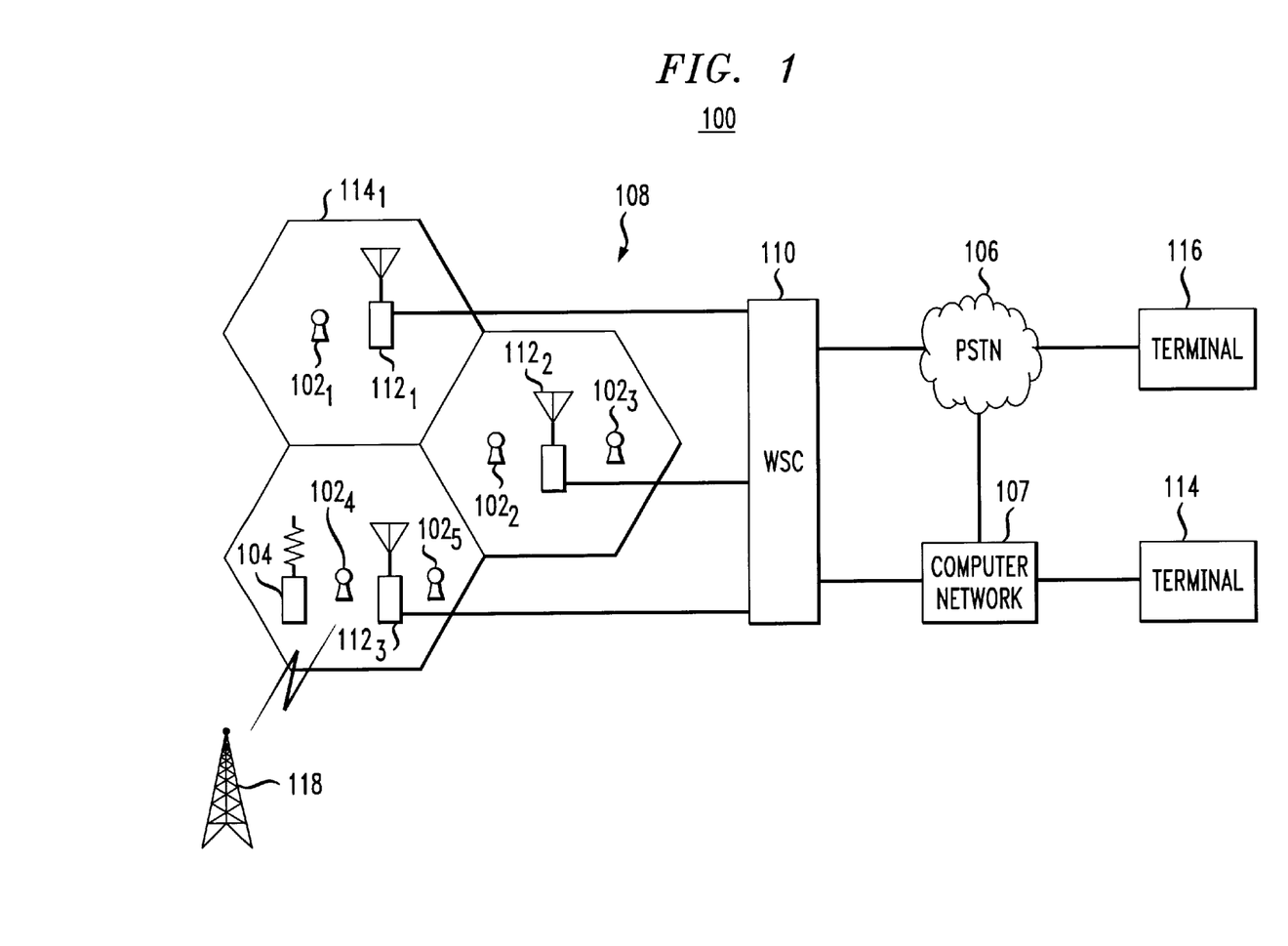
FIG. 1 depicts a schematic diagram of a portion of a telecommunications system that interoperates with one or more embodiments of the present invention.

FIG. 1 is a block diagram of telecommunications system 100, which interoperates with one or more embodiments of the present invention. Telecommunications system 100 illustratively comprises public switched telephone network ("PSTN") 106, wireless telecommunications system 108, and computer network 107. Wireless telecommunications system 108 includes wireless switching center ("WSC") 110 and base stations $112_1$, $112_2$ and $112_3$, which are geographically dispersed throughout the region serviced by wireless telecommunications system 108. Further, telecommunications system 100 includes a paging system with paging transmitter 118.

The illustrative embodiment comprises one or more "beacons" (e.g., beacons $102_1$, $102_2$, ..., $102_n$). Each beacon $102_i$ advantageously radiates an electromagnetic carrier that is modulated with data including, among other things, an identifying signal (e.g., a telephone number, an Internet address) of an associated communication terminal that is accessible via telecommunications system 100 and addressable by the identifying signal. Paging transmitter 118 can provide a signal to a beacon to remotely modify, for example, the identifying signal for the beacon as described more fully below. The details of where beacon $102_i$ is located and what information it radiates will be discussed below.

For the purposes of this specification, a "communications terminal" includes, but is not limited to, any device that is associated with an identifying address (e.g., a wireless terminal, a wireline terminal, an automatic call distribution system), and a "wireless terminal" includes, but is not limited to, a wireless telephone or videophone, a wireless fax machine, a wireless computer. Also for the purposes of this specification, a "wireline terminal" includes, but is not limited to, a wireline telephone or videophone, a wireline fax machine, a wireline computer.

Communication terminal 104 includes a directional receiver that receives the electromagnetic carrier from a beacon such as beacon $102_1$. Communication terminal 104 uses the identifying signal from the electromagnetic carrier to initiate a call to, for example, terminal 116 or terminal 114.

Figure 2A:
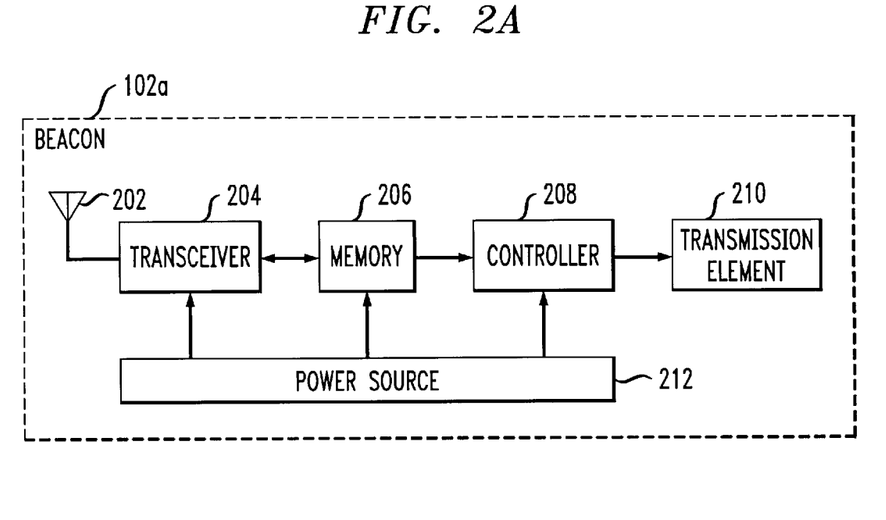
FIG. 2a depicts a block diagram of a beacon for use in the telecommunications system of FIG. 1.

FIG. 2a depicts a block diagram of an illustrative embodiment of the present invention designated generally as beacon $102_a$. Beacon $102_a$ includes transmission element 210 that transmits an electromagnetic carrier modulated with data. The frequency of the electromagnetic carrier is advantageously chosen so that: (1) absorption of the electromagnetic carrier by glass (e.g., automobile window glass), clothing and animal tissue is sufficiently small so that unacceptable attenuation of the electromagnetic carrier does not occur, and (2) the diffraction of the electromagnetic carrier around everyday objects is kept low.

The reason that it is advantageous for absorption by glass to be sufficiently small is that it enables a user with a directional receiver that is separated from a beacon by a glass window and who can see the beacon to be able to receive the electromagnetic carrier. The reason that it is advantageous for absorption by clothing to be sufficiently small is to enable the electromagnetic carrier to be received by a user when the beacon is on or in someone's clothing (e.g., an inside coat pocket). The reason that it is advantageous for absorption by animal tissue to be sufficiently small is to enable the electromagnetic carrier to be received when a human is interposed between the beacon and the directional receiver. The diffraction of the electromagnetic carrier should be kept low so as to reduce the likelihood that an electromagnetic carrier could be received from a beacon whose existence is not known to the user.

Transmission element 210 advantageously may comprise, for example, a light emitting diode or other radiator. Controller 208 of beacon $102a$ generates the modulated electromagnetic carrier with data from memory 206. As shown in Table 1, below, the data modulated onto the electromagnetic carrier may include "user data" and "transmissive data" as well as the identifying signal.

TABLE 1

Examples of Information Broadcast by a Beacon

| Example No. | Identifying Signal | User Data | Transmissive Data |
|---|---|---|---|
| 1 | 207-773-0796 | Police | Serial. No. 4444 |
| 2 | 207-799-0553 | McDonald's 2 Miles ahead | — |
| 3 | 1-800-555-1212 | — | 45° 35' 7" N. 78° 4' 13" E. |
| 4 | 402-0932 | Fax. | — |

The user data is data that can be output to the user of a communication terminal that receives the electromagnetic carrier from beacon $102a$. In Example No. 1, the communication terminal may display "Police" or convert the text to speech. It is noted that the user data is not limited to text. Rather, the user data may comprise video, audio, or a picture. Further, transmissive data can include, for example, the latitude and longitude of the beacon, or the serial number of the beacon that can be transmitted by a communication terminal to the communication terminal associated with the beacon as part of the call.

Controller 206 advantageously encodes the identifying signal, the user data and transmissive data into a data structure that can be unambiguously parsed by the receiver of the electromagnetic carrier. Controller 206 also advantageously encodes the identifying signal, user data and transmissive data to provide a measure of error correction and/or detection, and can encrypt the identifying signal, user data and transmissive data to facilitate privacy. Furthermore, controller 206 provides a synchronization signal so that the receiver can acquire the data and modulates the identifying signal, user data and transmissive data in well-known fashion (e.g., quadrature phase shift keying, binary phase shift keying).

Beacon $102a$ can be preprogrammed, for example, by the factory or dealer selling the beacon or by the owner of the beacon prior to setting the beacon up for use. For example, the beacon can be distributed or sold individually or as a package with a communication terminal. When distributed as a package, a dealer can pre-store the identifying address of the wireless terminal at the same time that the wireless terminal is assigned a telephone number. A user of the communication terminal can then set up the corresponding beacon at a desired location.

The data in memory 206 of beacon 102a may be remotely modified. Beacon 102a includes transceiver 204 that is coupled between antenna 202 and memory 206. Transceiver 204 may comprise a one-way or two-way pager as are well-known in the art. Antenna 202 and transceiver 204 receive an electromagnetic carrier modulated with the new data for beacon 102a from, for example, a paging network. The new data is stored in memory 206 and used by controller 208 to generate the modulated electromagnetic carrier signal for beacon 102a. Transceiver 204 can also transmit a confirmation signal to the paging network that the new data has been received.

Beacon 102a advantageously comprises power source 212, such as a solar cell and battery, that is coupled to provide power to transceiver 204, memory 206, and controller 208. By using a solar cell and battery, beacon 102a can be used in remote locations that lack an electrical outlet. Alternatively, power source 212 can be a replaceable battery source or an AC to DC converter for converting a household line voltage to voltages suitable for driving the electronic circuitry. Various combinations of these and other types of power sources can be used for powering the beacon.

Figure 2B:
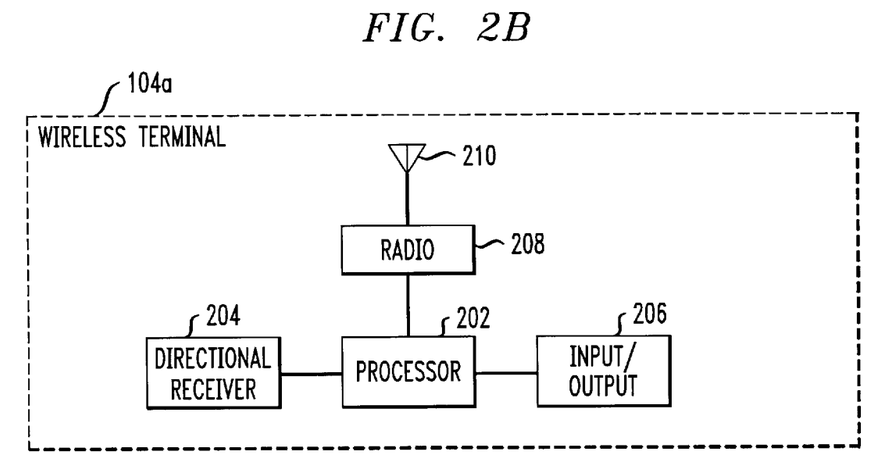
FIG. 2b depicts a block diagram of a wireless terminal for use in the telecommunications system of FIG. 1.

FIG. 2b depicts a block diagram of communication terminal 104a, which is capable of being a wireless terminal. Wireless terminal 104a comprises processor 202 that is communicatively coupled to directional receiver 204, input/output 206 and radio 208. Wireless terminal 104a also comprises antenna 210, which is communicatively coupled to radio 208 so as to facilitate the transmission and reception of signals to and from a base station. Directional receiver 204 comprises, for example, a helical antenna.

The operation of wireless terminal 104a is as follows. A user points directional receiver 204 at a beacon to receive the electromagnetic carrier radiated by the beacon. Directional receiver 204 recovers the identifying signal from the electromagnetic carrier and provides the identifying signal to processor 202, in well-known fashion. Processor 202 then provides the identifying signal to radio 208, which uses the identifying signal, in well-known fashion, to initiate a call, via telecommunications system 100, to the communication terminal associated with the identifying address.

For example, when an embodiment receives an identifying signal and transmissive data, which might be the serial number of the beacon, the embodiment could initiate the call based on the identifying signal, and, when the call is established, send the serial number to the called communication terminal. Alternatively, the embodiment could concatenate the transmissive data to the identifying signal and transmit the transmissive data as part of the call establishment process. In such case, the telecommunications infrastructure would receive and process the transmissive data.

Figure 3:
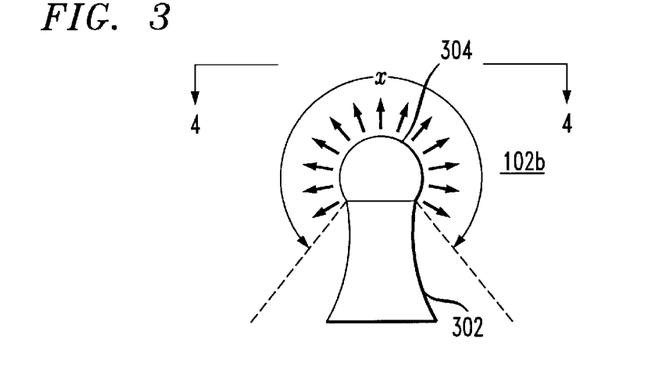
FIG. 3 depicts a side elevational view of a beacon for use in the telecommunications system of FIG. 1.
Figure 4:
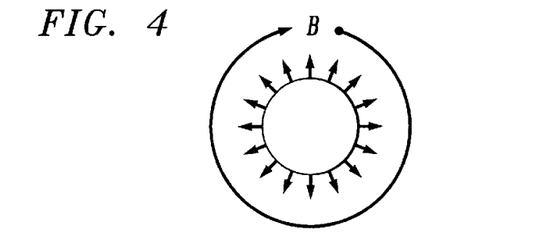
FIG. 4 depicts a top view taken along line 4—4 of the beacon of FIG. 3.

FIG. 3 depicts an elevational view of an illustrative embodiment of the present invention. Beacon 102b includes a base 302 housing electronic circuitry for implementing embodiments of the present invention. Beacon 102b also includes transmission housing 202 that houses a transmission element. According to an embodiment of the present invention, the transmission element comprises an antenna or light emitting diode that radiates or emits an electromagnetic carrier in a wide range of angles (e.g., omnidirectionally). For example, as represented by angle α in FIG. 3, the antenna radiates an electromagnetic carrier that is substantially normal to the surface of antenna housing 304. In addition, as represented by angle β in FIG. 4, the antenna radiates the electromagnetic carrier in all directions 360° about its base.

Beacon 102b can be mounted to existing structures in many different ways. For example, beacon 102b can include a weighted base so that the beacon can be simply placed on the ground or on a pedestal. In the alternative, beacon 102b can include a suction cup or magnetic base permitting it to be mounted, e.g., to an automobile or other vehicle. Of course, various other mounting devices can be used, depending on a user's particular needs. In addition, as described more fully below, beacon 102b can be made integral with the communication terminal itself.

Figure 5:
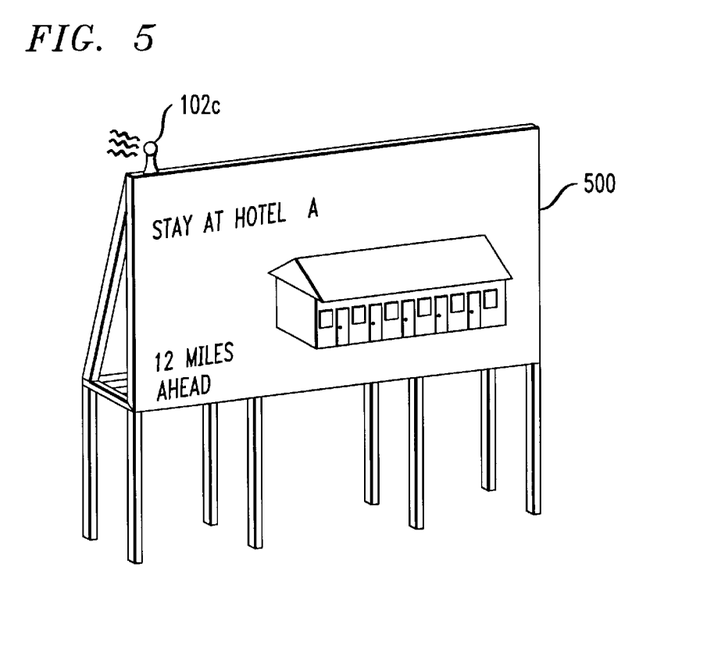
FIGS. 5 through 7 illustrate other embodiments of the present invention that can interoperate with the telecommunications system of FIG. 1.
Figure 6:
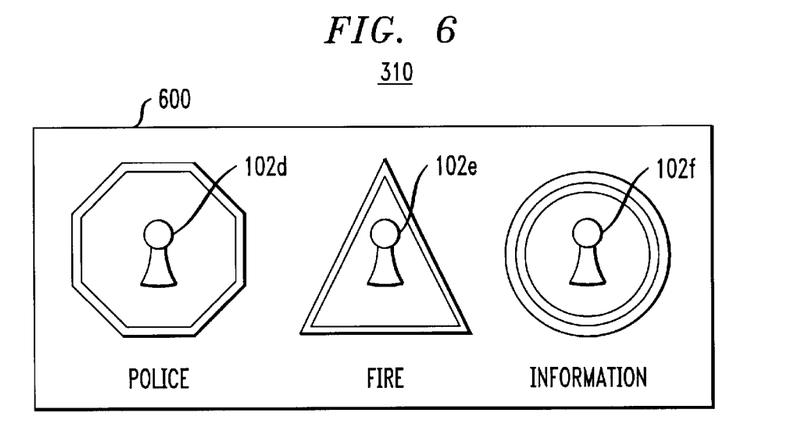
Figure 7:
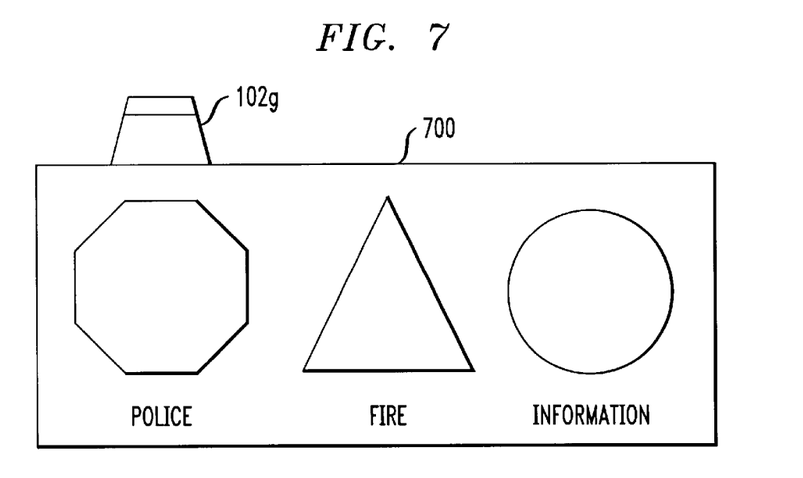

FIGS. 5 through 7 illustrate additional exemplary embodiments of the present invention for use with telecommunications system 100 of FIG. 1. The exemplary embodiments advantageously combine conventional advertising or informational signs with a beacon to assist users of wireless terminals to initiate a call to, for example, a communication terminal associated with an advertiser.

FIG. 5 illustrates an embodiment that includes billboard 500 and an associated beacon 102c. Billboard 500 may be disposed adjacent to a highway or street as is well known in the art. Billboard 500 displays, for example, an advertisement for a hotel or other establishment.

Beacon 102c radiates an electromagnetic carrier that is modulated with an identifying signal for a communication terminal associated with the advertiser. Advantageously, beacon 102c may be disposed on billboard 500 as shown. Alternatively, beacon 102c can be placed in another location such that a wireless terminal, as described in the copending application, receives the electromagnetic carrier from beacon 102c when directed at beacon 102c. In operation, a user of a wireless terminal communicates with an advertiser by receiving the identifying signal from beacon 102c and using the signal to initiate a call to a communication terminal associated with the advertiser.

FIG. 6 illustrates another exemplary embodiment of the present invention. Beacons 102d, 102e, and 102f are mounted on a sign 600 so as to broadcast multiple identifying signals. The identifying signals may identify different entities or advertisers. For example, sign 600 can provide frequently used, emergency, or informational telephone numbers such as police department, fire department or information. Sign 600 can be mounted in or on a building, adjacent to a highway or in other public or private places that are accessible to large volumes of people. Alternatively, as shown in FIG. 7, beacon 102g can radiate an electromagnetic carrier modulated with the identifying signal for each advertiser that advertises on sign 700. In this embodiment, the electromagnetic carrier can also radiate user data (e.g., alphanumeric tags "Police", "Fire", and "Information") that is displayed to the user of a wireless terminal to select the appropriate identifying signal for use in initiating a call. In operation, the wireless terminal user points the directional receiver of the wireless terminal at beacon 102g and receives the three identifying signals and the associated user data. The wireless terminal displays the user data to the user. The user selects the identifying signal based on the displayed user data and initiates a call to a communication terminal associated with the appropriate advertiser.

The embodiments of FIGS. 5 through 7 can be used in a wide range of applications. For example, many airports, bus and train stations have courtesy telephones arranged adjacent to a sign advertising local hotels, restaurants and car rental agencies. Such courtesy telephones can be replaced by, or supplemented with, one or more beacons mounted on or near the sign that transmit identifying signals for the advertisers. Travelers with wireless terminals can contact a desired advertiser by pointing the directional receiver at the appropriate beacon and initiating a call. Further, a beacon may be placed on a sign at a drive-thru restaurant. When a patron reaches the sign to place an order, the patron can initiate a call with a wireless terminal. Thus, the patron avoids the frustration of communicating over the typical intercom systems used by these establishments.

In some circumstances, there can be several beacons in close proximity to one another. Advantageously, wireless terminal 104a is able to distinguish between the electromagnetic carriers radiated by those beacons, and the user is able to select which identifying signal radio 208 uses by pointing directional receiver 204 at the beacon whose electromagnetic carrier the user desires to receive. Directional receiver 204 advantageously comprises a highly-directional antenna with a conic field-of-view (i.e., beamwidth) of between 2° and 5°. From a functional perspective, the directional nature of directional receiver 204 allows a user to discriminate between signals radiated from a plurality of proximate beacons by pointing directional receiver 204 at the desired beacon.

Figure 14:
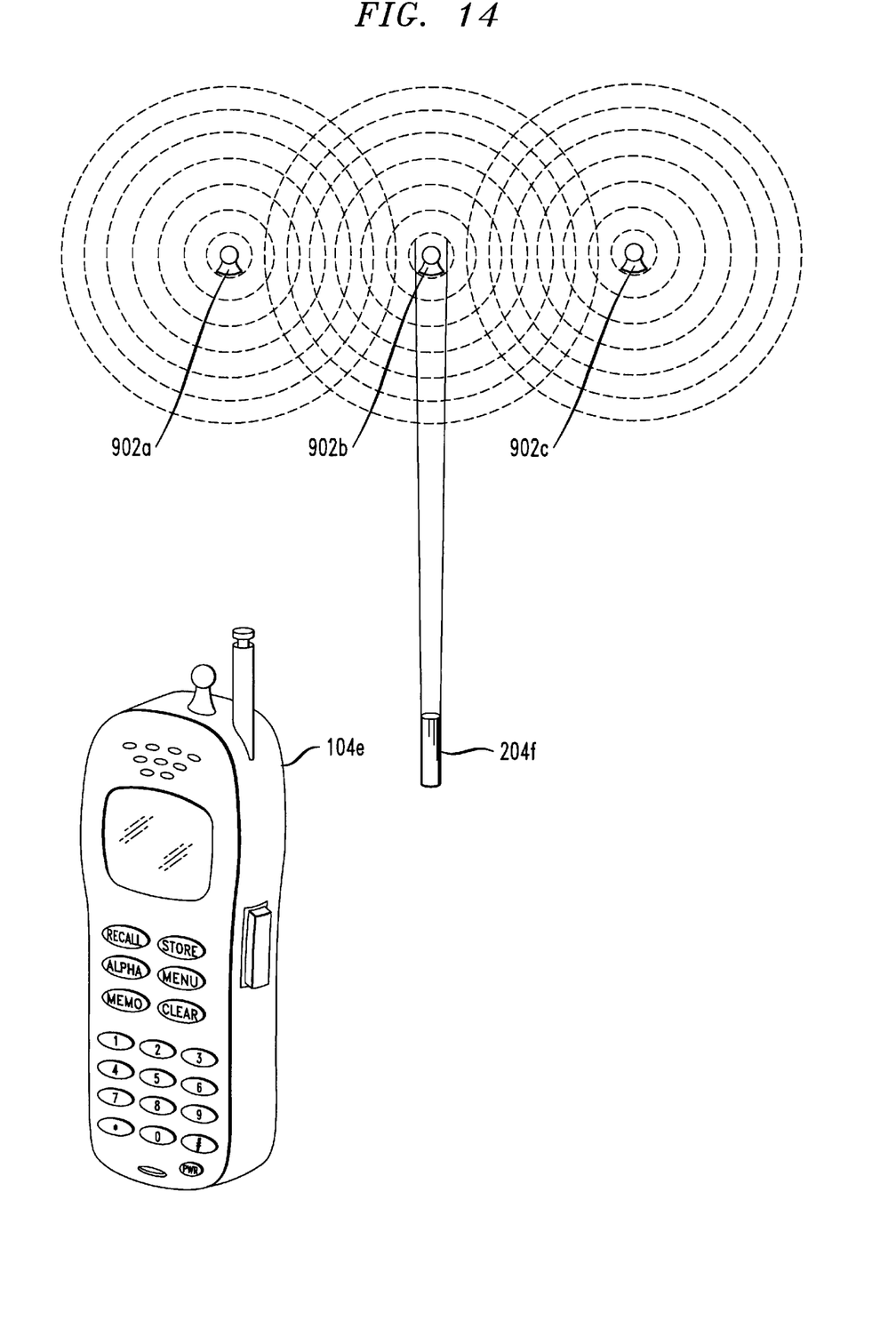
FIG. 14 illustrates a method for using an illustrative embodiment of the present invention.

For example, as shown in FIG. 14, beacons 902a, 902b, and 902c are in close proximity and each radiate the identifying address of a different communication terminal. Beacons 902a, 902b, and 902c can be placed in close proximity, such as on a billboard or sign advertising more than one service or organization. In other cases, beacons 902a, 902b, and 902c can be quite distant from one another, but because of perspective merely appear to be close. For example, the three beacons could be on three successive automobiles on a highway and the user is in a fourth automobile behind them. The directional nature of directional receiver 204 thus enables the user to call the occupants of whichever of the three automobiles he or she desires.

Directional receiver 204 may interface with processor 202 in a variety of ways. For example, directional receiver 202 may be fabricated, and rigidly fixed, within the structural housing of wireless terminal 104a. In such case, the interface from directional receiver to processor 202 can comprise a wire or a conductor on a printed circuit board. According to this arrangement, the user effectively points directional receiver 204 by holding and pointing the housing of wireless terminal 104a.

Figure 8:
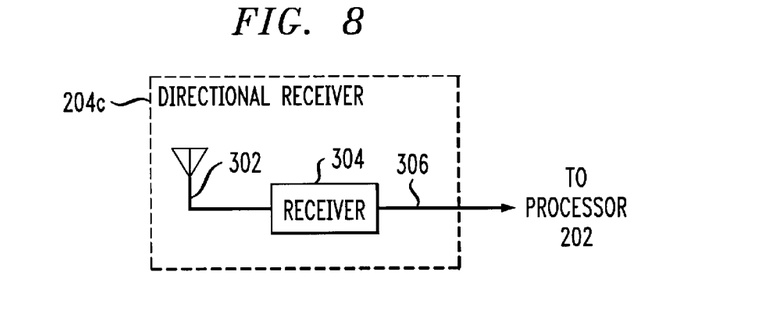
FIG. 8 is a block diagram of an embodiment of a directional receiver.

Alternatively, directional receiver 204 can be housed in a separate housing that is communicatively coupled to processor 202 by a wire, as shown in FIG. 8. Directional receiver 204a comprises directional antenna 302 that is coupled to receiver 304. Wire 306 couples receiver 304 to processor 202 of FIG. 2b. Wire 306 may comprise a wire, an optical fiber, a conductor on a printed circuit board or other connection between receiver 304 and processor 202. In operation, directional antenna 302 receives an electromagnetic carrier from a beacon and transmits the signal to processor 202 via receiver 304 and wire 306.

In some circumstances, a wired interface between directional receiver 204 and processor 202 can be cumbersome. For example, wire 306 of FIG. 8 can tangle easily. Thus, directional receiver 204 may alternatively interface with processor 202 via a wireless connection.

Figure 9:
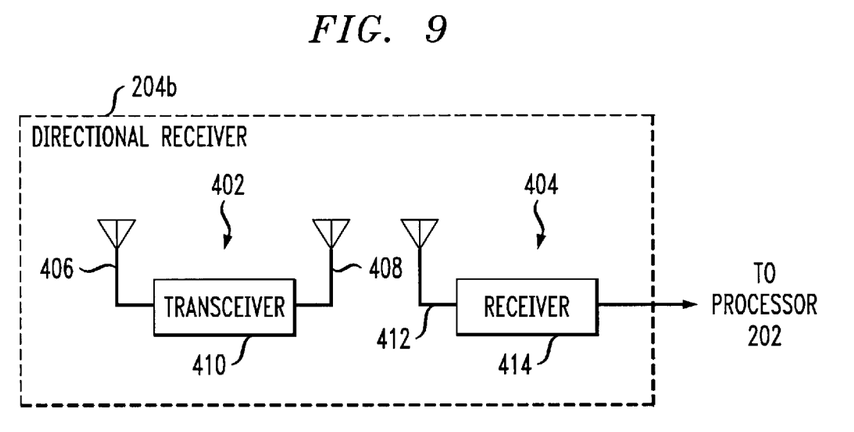
FIG. 9 is a block diagram of another embodiment of a directional receiver.

FIG. 9 is a block diagram of an embodiment of a directional receiver that illustrates a wireless interface with processor 202. Directional receiver 204b advantageously includes a removable, hand-held wand 402 that communicates with communication circuit 404, which is inside the housing of the wireless terminal with processor 202.

Wand 402 comprises directional antenna 406 that is coupled to transmit antenna 408 through transceiver 410. Communication circuit 404 comprises antenna 412 that is coupled to receiver 414. In operation, a user positions wand 402 so that directional antenna 406 is pointed at a beacon to receive the electromagnetic carrier. Transceiver 410 transmits the electromagnetic carrier to communication circuit 404, in well-known fashion. Communication circuit 404 receives the signal and provides it to processor 202. It is preferred that antenna 412 be omni-directional so that the relative spatial relationship and orientation between wand 402 and communication circuit 404 is unimportant to the operation of the embodiment.

Figure 10:
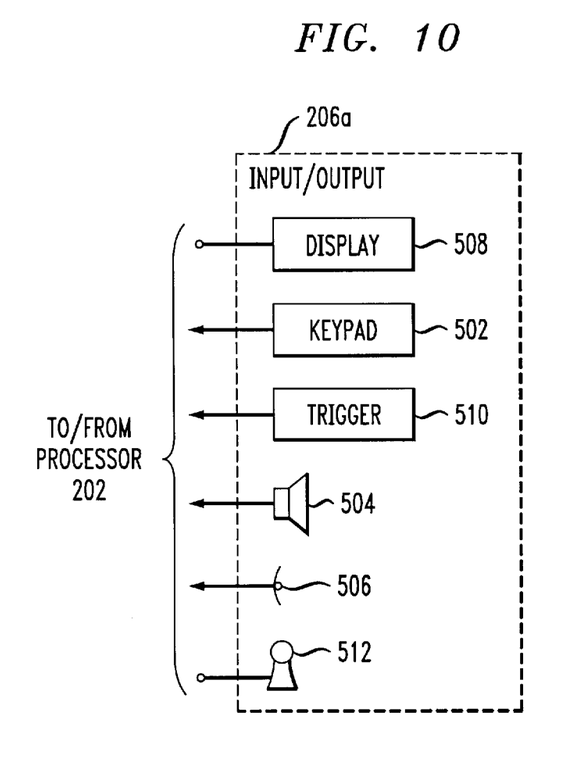
FIG. 10 is a block diagram of an embodiment of the input/output associated with the embodiment in FIG. 2.

FIG. 10 is a block diagram of input/output 206 for wireless terminal 104a of FIG. 2b. Input/output 206a comprises: display 508, keypad 502, trigger 510, audio speaker 504, microphone 506 and beacon 512. Display 508, keypad 502, microphone 506 and audio speaker 504 are all made and used in well-known fashion.

As mentioned above, a beacon can transmit user data (e.g., the name of the party associated with the identifying signal, a short advertisement, etc.) to be output to the user. This user data can be conveyed to the user visually via display 508 or audibly through audio speaker 504. Processor 202 is advantageously capable of converting user data to speech, in well-known fashion.

It may not be desirable for wireless terminal 104a to initiate a call every time its directional receiver fortuitously receives an identifying signal from a beacon. Therefore, it may be advantageous for the user to be able to control when the embodiment initiates a call based on a received identifying signal. For this reason, there exists trigger 510.

When trigger 510 is asserted by a user, processor 202 advantageously initiates a call using the currently received or the next received identifying signal. Trigger 510 may comprise a mechanical trigger such as a depressable button that is disposed on the wireless terminal or on the removable directional receiver or wand. Alternatively, the embodiment can comprise voice recognition capability so that trigger 510 can be asserted by voice command of the user. Furthermore, input/output 206a advantageously provides audio, video and/or tactile feedback to the user to indicate when an identifying signal has been captured and a call initiated based on the identifying signal.

Input/output 206a may additionally comprise beacon 512 for transmitting an identifying signal associated the embodiment. This would enable a user of another embodiment to call the user of the illustrative embodiment.

Figure 11:
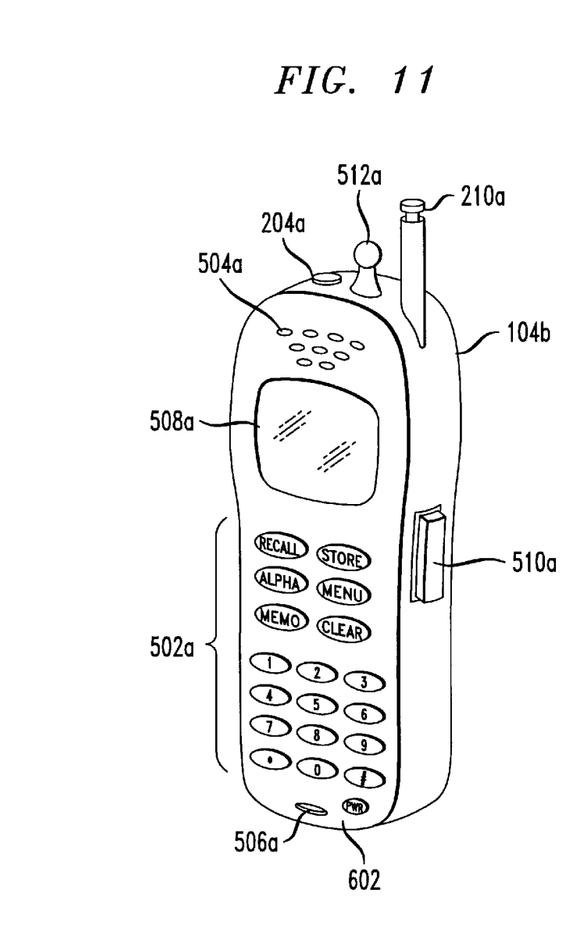
FIG. 11 is an isometric diagram of another illustrative embodiment of the present invention.

For example, FIG. 11 depicts an embodiment of the present invention that includes both directional receiver 204c and beacon 512a. Wireless terminal 104b further advantageously comprises a housing 602 that holds processor 202 (not shown), radio 208 (not shown), antenna 210a, audio speaker 504a, display 508a, keypad 502a, microphone 506a and trigger 510a. Beacon 512a is advantageously structurally attached to housing 602.

To reduce the chance that the electromagnetic carrier transmitted by beacon 512a will interfere with the electromagnetic carrier that the user desires to capture, wireless terminal 104b may temporarily disable beacon 512a from radiating when trigger 510a is depressed.

Figure 12:
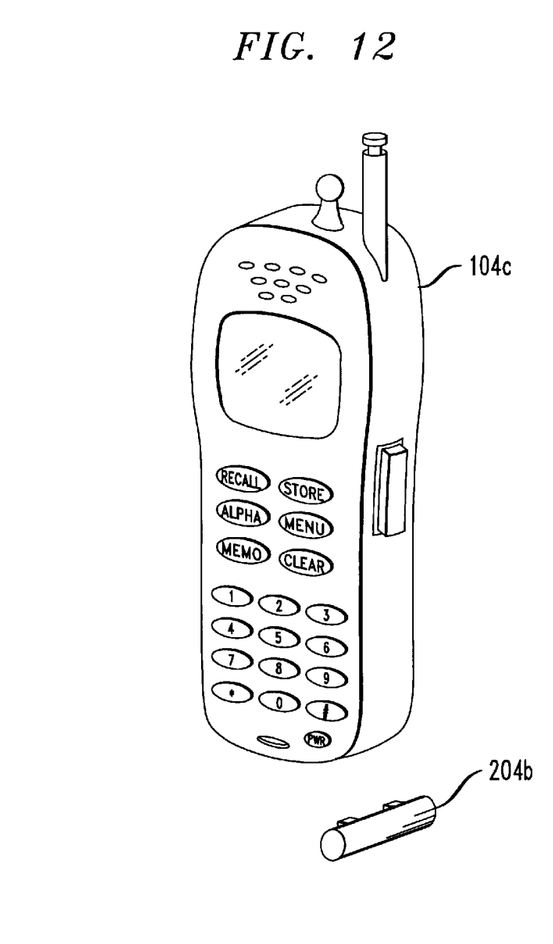
FIG. 12 is an isometric diagram of another illustrative embodiment of the present invention.
Figure 13:
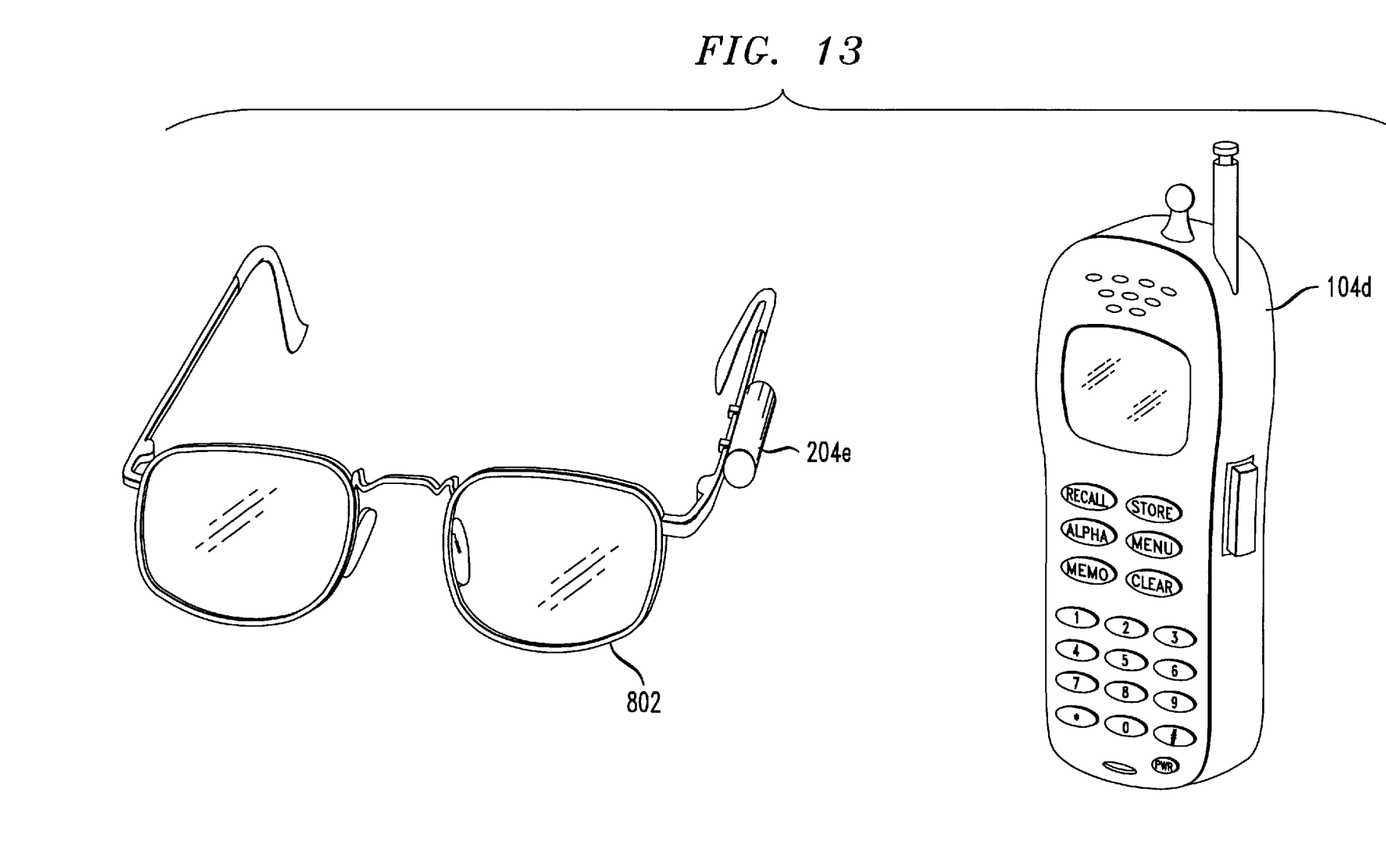
FIG. 13 is an isometric diagram of another illustrative embodiment of the present invention.

Although in this embodiment directional antenna 204c is either temporarily or permanently attached to housing 602, it is advantageously affixed in such a manner that a user of the embodiment can effectively aim or point directional antenna 204c by manually holding and pointing with wireless terminal 104b at a beacon. In other embodiments of the present invention, a directional receiver may be contained in a separate housing. For example, wireless terminal 104c of FIG. 12 comprises wand 402b that is wirelessly coupled to wireless terminal 104c. Further, as shown in FIG. 13, wand 402c is structurally coupled to a pair of glasses 802 and wirelessly coupled to wireless terminal 104d.

When a beacon is structurally attached to the communications terminal whose identifying signal it radiates, the beacon is said to be a "neighbor" beacon. When a beacon is not structurally attached to the communication terminal whose identifying signal it radiates, the beacon is said to be a "proxy" beacon. It will be clear to those skilled in the art that there are applications in which it is preferred that one or more neighbor beacons be employed, applications in which it is preferred that one or more proxy beacons be employed, and applications where both neighbor and proxy beacons are employed.

To facilitate privacy and restrict the number of users who can receive information radiated by a beacon, the user data, transmissive data and/or identifying signal radiated by a beacon may be encrypted, in well-known fashion. In such cases, processor 202 must be capable of decrypting the encrypted information. Processor 202 may be given the cryptographic key via a keypad or penpad, or via telecommunications system 100.

Although the present invention has been described with emphasis on particular embodiments for providing an identifying address to communication terminals, it should be understood that the Figures are for illustration of exemplary embodiments of the present invention only and should not be taken as limitations or thought to be the only means of carrying out the present invention. For example, the present invention is not limited to cellular networks, but rather may be employed into numerous communication systems, such as a Personal Communication System or into communication systems utilizing Personal and/or Terminal Mobility managers. Further, it is contemplated that many changes and modifications may be made to the present invention without departing from the spirit and scope of the invention as disclosed above.

What is claimed is:

1. A wireless terminal capable of initiating a telecommunications call to a communications terminal, said wireless terminal comprising:
   a directional receiver for receiving a first electromagnetic carrier having modulated thereon an identifying signal for said communications terminal;
   a processor responsive to said directional receiver for recovering said identifying signal from said first electromagnetic carrier;
   a radio responsive to said processor for initiating said telecommunications call based on said identifying signal; and
   a beacon for radiating a second electromagnetic carrier having modulated thereon a second identifying signal that is associated with said wireless terminal;
   wherein said second electromagnetic carrier is at a frequency that is outside the frequency band used by said radio.

2. The wireless terminal of claim 1 wherein said first identifying signal comprises a telephone number.

3. The wireless terminal of claim 1 further comprising a trigger operatively coupled to said processor, wherein activation of said trigger initiates said call.

4. The wireless terminal of claim 3 wherein activation of said trigger disables said beacon from radiating.

5. The wireless terminal of claim 3 wherein said trigger can be activated by voice command.

6. The wireless terminal of claim 3 wherein said trigger is a momentary switch.

7. The wireless terminal of claim 6 further comprising means for disabling said beacon from radiating said second electromagnetic carrier when a trigger is asserted.

8. The wireless terminal of claim 1 wherein said directional receiver has a beamwidth of between 2° and 5°.

9. The wireless terminal of claim 1 further comprising a structural housing that contains said directional receiver, said radio and said processor.

10. The wireless terminal of claim 1 wherein said directional receiver includes an antenna element that is detachable from a structural housing that houses said processor.

11. The wireless terminal of claim 10 wherein said antenna element is wirelessly connected to said processor.

12. The wireless terminal of claim 10 wherein said antenna element is configured to be hand-held.

13. The wireless terminal of claim 10 wherein said antenna element is configured to be mounted to a pair of eyeglasses.

14. The wireless terminal of claim 1 wherein said directional receiver includes a helical antenna.

15. The wireless terminal of claim 1 wherein said first electromagnetic carrier is at infrared frequency.

16. The wireless terminal of claim 1 wherein said first electromagnetic carrier has a frequency of 28 GHz.

17. The wireless terminal of claim 1 wherein said first electromagnetic carrier carries transmissive data in addition to said identifying signal.

18. The wireless terminal of claim 1:
   wherein said first electromagnetic carrier carries transmissive data; and
   wherein said processor is for transmitting at least a portion of said transmissive data as part of said telecommunications call.

19. The wireless terminal of claim 1 further comprising:
   a display; and
   wherein said first electromagnetic carrier carries user data in addition to said identifying signal; and
   wherein said processor is for displaying at least a portion of said user data on said display.

20. The wireless terminal of claim 1 further comprising:
   an audio speaker; and
   wherein said first electromagnetic carrier carries user data in addition to said identifying signal; and
   wherein said processor is for outputting at least a portion of said user data through said audio speaker.

21. The wireless terminal of claim 1 further comprising means for providing audio feedback to indicate when said wireless terminal has received said identifying signal.

22. The wireless terminal of claim 1 wherein said beacon is capable of transmitting said second electromagnetic carrier in the infrared spectrum.

23. The wireless terminal of claim 1 wherein said beacon is capable of transmitting a 28 GHz electromagnetic carrier.

24. The wireless terminal of claim 1 wherein said beacon is mounted integrally with said radio in a structural housing.

25. A method of operating a wireless terminal, said method comprising:
   receiving, with a directional receiver, a first electromagnetic carrier having modulated thereon an identifying signal for a communications terminal;
   recovering said identifying signal from said first electromagnetic carrier;
   initiating, with a radio, a telecommunications call based on said identifying signal; and radiating, with a beacon, a second electromagnetic carrier having modulated thereon a second identifying signal that is associated with said wireless terminal;

wherein said second electromagnetic carrier is at a frequency that is outside the frequency band used by said radio.

26. The method of claim 25 wherein said first identifying signal comprises a telephone number.

27. The method of claim 25 further comprising triggering, with a trigger, said wireless terminal to initiate said telecommunications call.

28. The method of claim 27 wherein said triggering said wireless terminal temporarily disables said beacon from radiating.

29. The method of claim 27 wherein said trigger can be activated by voice command.

30. The method of claim 25 wherein said electromagnetic carrier also has modulated thereon transmissive data in addition to said identifying signal, and further comprising:

recovering said transmissive data from said electromagnetic signal; and transmitting at least a portion of said transmissive data as part of said telecommunications call.

31. The method of claim 25 wherein said first electromagnetic carrier also has modulated thereon user data in addition to said identifying signal, and further comprising:

recovering said user data from said first electromagnetic signal; and outputting at least a portion of said user data via a display.

32. The method of claim 25 wherein said first electromagnetic carrier also has modulated thereon user data in addition to said identifying signal, and further comprising:

recovering said user data from said first electromagnetic signal; and outputting at least a portion of said user data via an audio speaker.

33. The method of claim 25 further comprising providing audio feedback to indicate when said wireless terminal has received said identifying signal.

* * * * *